United States Patent [19]

Bevill

[11] Patent Number: 4,848,717
[45] Date of Patent: Jul. 18, 1989

[54] STAND FOR SUPPORTING AND METHOD OF TESTING AN ENGINE

[76] Inventor: Fred Bevill, Rte. 4, Box 235, Denison, Tex. 75020

[21] Appl. No.: 39,603

[22] Filed: Apr. 16, 1987

[51] Int. Cl.[4] .......................................... F16M 13/00
[52] U.S. Cl. .................................. 248/670; 248/676; 248/124; 269/17; 73/116
[58] Field of Search ............... 248/637, 646, 670, 671, 248/672, 673, 676, 122, 129, 163.1, 165, 172, 124; 269/17; 254/2 B, 8 B, 134; 73/116

[56] References Cited

U.S. PATENT DOCUMENTS

| | | | |
|---|---|---|---|
| 1,065,979 | 7/1913 | Spencer | 248/676 X |
| 1,424,190 | 8/1922 | Cole | 248/676 X |
| 1,750,199 | 3/1930 | Spahn | 248/676 X |
| 2,238,294 | 4/1941 | Scott | 248/673 X |
| 2,408,247 | 9/1946 | Wekeman | 248/165 X |
| 2,613,914 | 10/1952 | Wallace | 254/134 X |
| 2,741,830 | 4/1956 | Lewis | 269/296 X |
| 2,879,059 | 3/1959 | Sandefur | 269/17 |
| 2,885,165 | 5/1959 | Smolen | 248/124 X |
| 3,538,759 | 11/1970 | Schrom | 73/116 |
| 3,751,978 | 8/1973 | Crawford | 73/49.7 |
| 3,850,419 | 11/1974 | Craig | 269/17 |
| 3,949,976 | 4/1976 | Cofer | 269/17 |
| 4,239,196 | 12/1980 | Hanger | 269/17 |
| 4,285,233 | 8/1981 | Swis | 73/116 |
| 4,383,681 | 5/1983 | Walters | 269/17 |
| 4,466,294 | 8/1984 | Bennington | 73/116 X |
| 4,511,112 | 4/1985 | Ruehle | 248/676 X |
| 4,560,151 | 12/1985 | Grundy | 269/17 |
| 4,665,638 | 5/1987 | Morton | 248/172 X |

Primary Examiner—J. Franklin Foss
Assistant Examiner—Robert A. Olson
Attorney, Agent, or Firm—Harry C. Post, III

[57] ABSTRACT

An internal combustion engine may be tested by connecting a flexible inlet conduit leading from a coolant supply source to a coolant inlet provided on the engine. A flexible outlet conduit is connected to lead from a drain to a coolant outlet provided on the engine. A pressure gauge is mounted in fluid communication with a heater hose port provided on the engine. Coolant continuously flows from the coolant supply source through the inlet conduit, engine and outlet conduit to the drain. A pressure regulating valve in the inlet conduit is adjusted to provide the correct coolant pressure into the engine. The exterior of the engine is inspected for coolant leaks. A stand may be used to support an internal combustion during the test. The stand embodies a generally T-shaped frame that is rollingly supported above a support surface and supports a muffler to deaden the noise of the engine after it has been started.

11 Claims, 4 Drawing Sheets

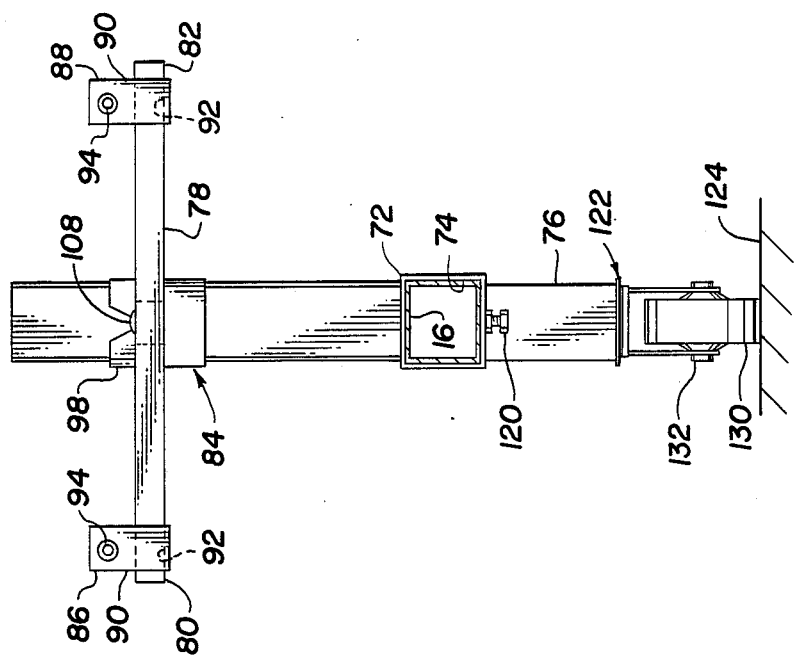
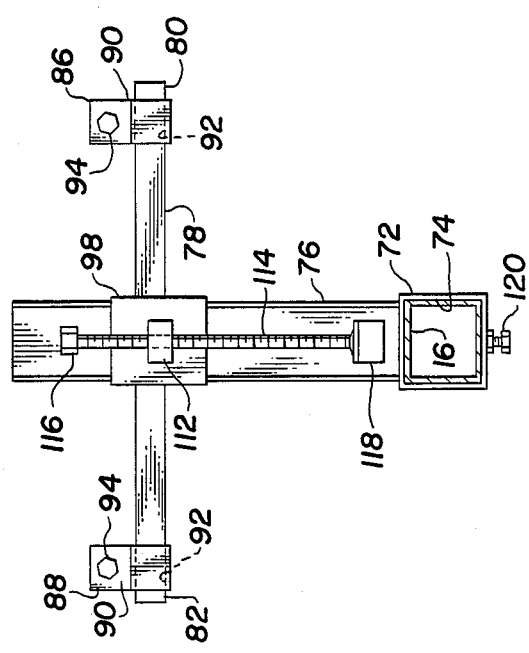
Fig. 4
Fig. 3

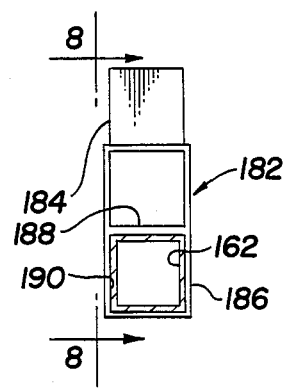
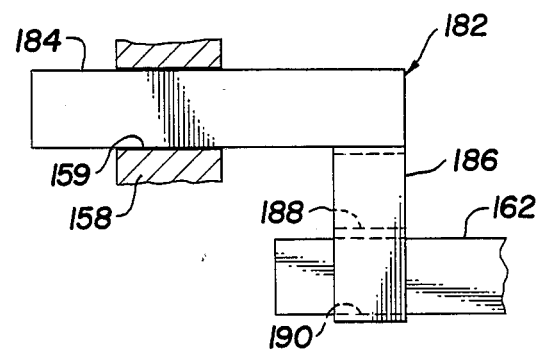
Fig. 7　　　　　Fig. 8
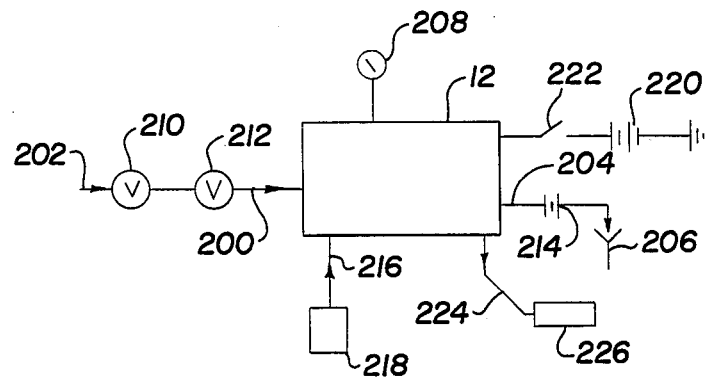
Fig. 9

STAND FOR SUPPORTING AND METHOD OF TESTING AN ENGINE

The use of a stand to support an internal combustion engine for testing and repair is well know. Some examples of such stands are disclosed in U.S. Pat. No. 1,065,979; U.S. Pat. No. 1,424,190; U.S. Pat. No. 1,750,199; U.S. Pat. No. 2,741,830; U.S. Pat. No. 2,885,165; U.S. Pat. No. 3,538,759; U.S. Pat. No. 3,751,978; U.S. Pat. No. 4,285,233; and U.S. Pat. No. 4,511,112. In U.S. Pat. No. 1,065,979; U.S. Pat. No. 1,424,190 and U.S. Pat. No. 2,885,165, and engine is supported by a frame that is permanently fixed to a support surface. In U.S. Pat. No. 1,750,199, a motor is supported by a frame that may not be readily moved by an individual once the motor is supported on the frame. In U.S. Pat. No. 2,741,830, an engine is supported by a massive device that rollingly supports the engine above a support surface. In U.S. Pat. No. 3,538,759 and U.S. Pat. No. 3,751,978, an engine is supported on a test stand, which is massive and may not be readily moved by an individual once the motor is supported on the stand. In U.S. Pat. No. 4,285,233 and U.S. Pat. No. 4,511,112, an engine is supported on a massive and complicated test stand permanently fixed to a support surface.

In the salvage business, a customer often requires a demonstration of a salvaged internal combustion engine to show that the engine has no coolant leaks when provided with the pressure at which the engine operates and that a salvaged internal combustion engine will operate in the proper manner. Further, in a small salvage yard where only a small number of individuals and a limited amount of space are available for each task, when demonstrating a salvaged internal combustion engine to the customer, it is desirable to support the salvaged internal combustion engine on a portable stand that is easily assembled and light weight so that a single individual can assemble or disassemble the stand, to allow a single individual to quickly and easily move the stand between locations while the engine is supported on the stand, and to support a muffler on a portable test stand so that after connecting the engine to the muffler the engine noise is deadened after the engine has been started. None of the methods disclosed in the prior art patents and none of the stands disclosed in the prior art patents fulfill these requirements.

Accordingly, it is an object of the present invention to provide a method to test an internal combustion for coolant leaks when the coolant pressure is provided at the pressure at which the engine normally operates without actually operating the engine.

Further, it is an object of the present invention to provide a method to test a salvaged internal combustion engine to insure it will operate in the correct manner.

Further, it is an object of the present invention to provide a portable internal combustion engine test stand, which is easily assembled and light weight so that a single individual can assemble or disassemble the stand.

Further, it is an object of the present invention to provide a portable internal combustion engine test stand, which allows a single individual to quickly and easily move the stand between locations while the engine is supported on the stand.

Further, it is an object of the present invention to provide a portable internal combustion engine test stand, which supports a muffler on a portable test stand so that by connecting the muffler to the engine the engine noise is deadened after the engine has been started.

In accordance with the present invention, a method of testing an internal combustion engine, comprises the steps of connecting a flexible inlet conduit leading from a coolant supply source to a coolant inlet provided on the engine. A flexible outlet conduit leading from a drain is connected to a coolant outlet provided on the engine. A pressure gauge is mounted in fluid communication with a heater hose port provided on the engine. The coolant is caused to flow from the coolant supply source through the inlet conduit, engine and outlet conduit to the drain. A pressure regulating valve provided in the inlet conduit is adjusted to provide the correct coolant pressure into the engine. The exterior of the engine is then inspected for coolant leaks.

Further, in accordance with the present invention, a portable stand is used to rollingly support an internal combustion engine. A frame is provided and includes an elongated portion and a cross portion connected to the elongated portion to form a generally T shape. An engine support device is adapted to be connected to the frame for supporting the engine above the frame. A frame support device is adapted to be connected to each end of the T-shaped frame for rollingly supporting the frame above a support surface. The frame is supported by the frame support device such that the elongated and cross portions of the frame forms a plane that lies substantially parallel to the support surface.

Further, in accordance with the present invention, a portable stand is used to test run an internal combustion engine. The stand has a frame and an engine support device connected to the frame for supporting the engine above the frame. A frame support device is connected to the frame for supporting the frame above a support surface. Apparatus for supplying fuel to the engine is provide and apparatus is connected to a stationary supply of water for continuously providing coolant to the engine. Apparatus is connected to a stationary drain for continuously receiving coolant from the engine and a muffler is connected to the frame for deadening the noise of the engine after the engine has been started.

Other objects and advantages of the invention will become apparent upon reading the following detailed description and upon reference to the drawings, wherein like reference characters are used throughout to designate like parts:

FIG. 3 is a back elevational view, partly in cross-section, taken along the lines and in the direction of the arrows 3—3 of the stand shown in FIG. 2;

FIG. 4 is a front elevational view, partly in cross-section, taken along the lines and in the direction of the arrows 4—4 of the stand shown in FIG. 2;

FIG. 7 is a side elevational view, partly in cross-section, of a portion of the invention shown in FIG. 2;

FIG. 8 is a front elevational view, partly in cross-section, of the portion of the invention shown in FIG. 7; and FIG. 9 is a schematic representation of the operating system to test the internal combustion engine shown in FIG. 1.

Turning now to the drawings, there is shown a portable stand 10 used to rollingly support and to test run an internal combustion engine 12 constructed according to the present invention.

Figure 1:
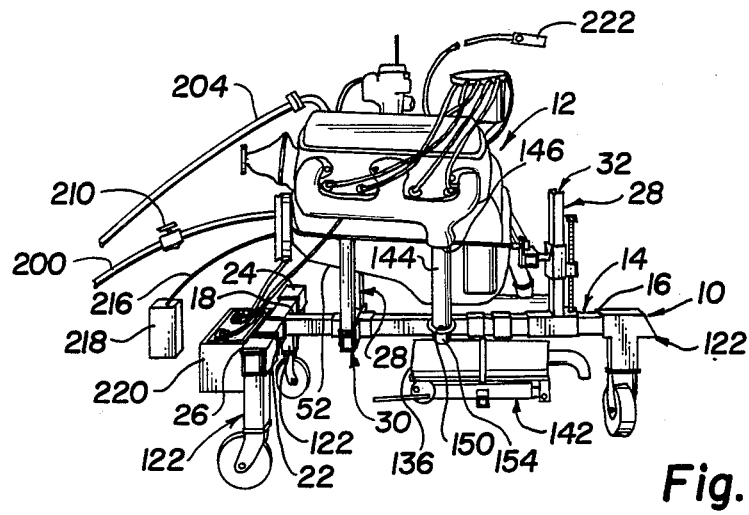
FIG. 1 is a perspective view of an internal combustion engine supported on a stand constructed according to the present invention.
Figure 2:
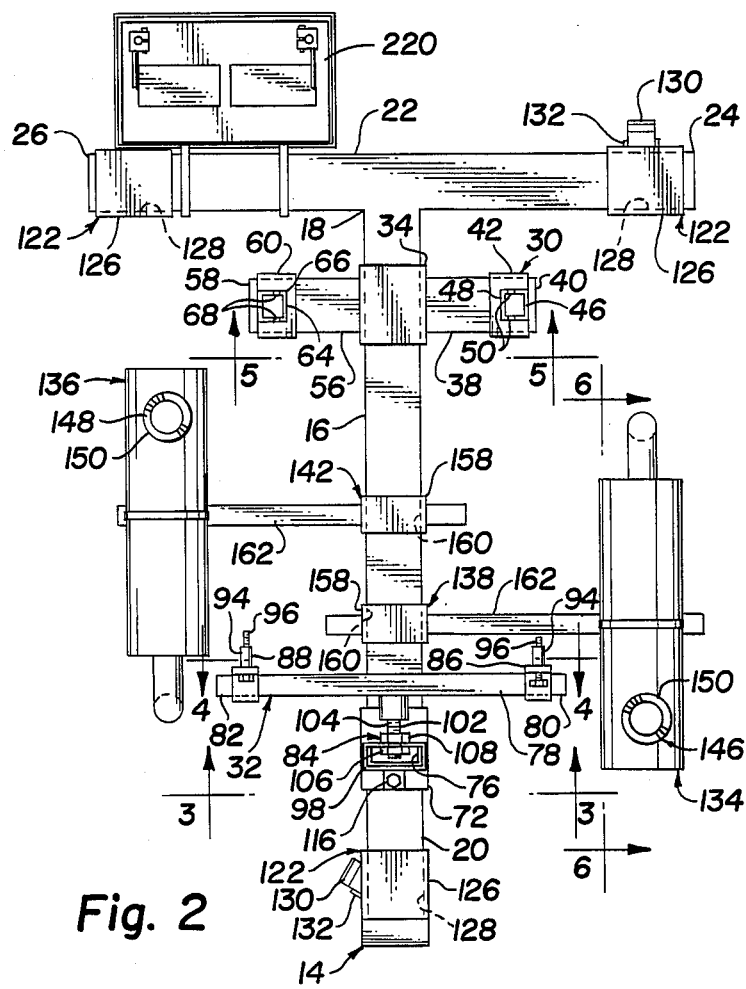
FIG. 2 is a plan view of the stand shown in FIG. 1.

As best seen in FIGS. 1 and 2, portable stand 10 comprises a frame 14 made from a tubular material having a square cross-section. An elongated portion 16 is included in frame 14 and has a front end 18 and a back end 20. Also included in frame 14 is a cross portion 22, which is connected to front end 18 of elongated portion 16. Cross portion 22 has left end 24 and right end 26 and is permanently affixed to front end 18 at a location approximately equidistant between ends 24 and 26 so as to form a generally T shape.

An engine support apparatus 28 supports engine 12 above frame 14. Engine support apparatus 28 comprises a first supporting device 30 and a second supporting device 32.

Figure 5:
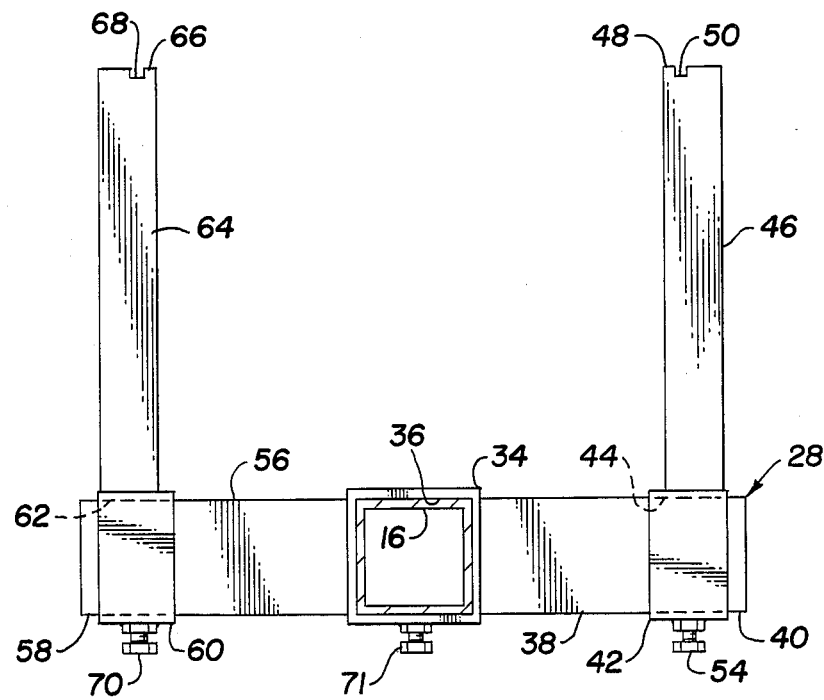
FIG. 5 is a back elevational view, partly in cross-section, taken along the lines and in the direction of the arrows 5—5 of the stand shown in FIG. 2.

First supporting device 30 engages a front portion of engine 12 and is best seen in FIGS. 1, 2 and 5. A tubular sleeve 34 has a passageway 36 with a square cross-section to complimentarily receive elongated portion 16 of frame 14 such that sleeve 34 is movable along elongated portion 16 between front end 18 and back end 20. A first or left cross support member 38 made of tubular material with a square cross-section is connected to sleeve 34 and extends toward the left into a left end 40, which is disposed on the left side of engine 12. A left tubular sleeve 42 is provided to move left or right along first cross support member 38 and has a passageway 44 with a square cross-section to complimentarily receive first cross support member 38 therein. A first or left tubular support column 46 is secured to sleeve 42 and has a length sufficient to support the engine at a location above and without contacting frame 14. The upper most edge of column 46 acts as a shoulder 48 to support engine 12. A slot 50 is provided in shoulder 48 so as to receive a lip of an oil pan 52 used on engine 12. A locking bolt 54 is threadedly connected to sleeve 42 to engage first cross support member 38 and thereby secure support column 46 to first cross support member 38. A second or right cross support member 56 made of tubular material with a square cross-section is connected to sleeve 34 and extends toward the right into a right end 58, which is disposed on the right side of engine 12. A right tubular sleeve 60 is provided to move left or right along second cross support member 56 and has a passageway 62 with a square cross-section to complimentarily receive second cross support member 56 therein. A second or right tubular support column 64 is secured to sleeve 60 and has a length sufficient to support engine 12 at a location above and without contacting frame 14. The upper most edge of column 64 acts as a shoulder 66 to support engine 12. A slot 68 is provided in shoulder 66 so as to receive a lip of oil pan 52. A locking bolt 70 is threadedly connected to sleeve 60 to engage second cross support member 56 and thereby secure support column 64. After engine 12 is supported on shoulder 48 of first tubular support column 46 and on shoulder 66 of second tubular support column 64, a locking bolt 71 threadedly connected to sleeve 34 is rotated to engage elongated portion 16 of frame 14 and thereby prevent movement of first engine supporting device 30 relative to frame 14.

Second supporting device 32 engages a rear portion of engine 12 and is best seen in FIGS. 1–4. A tubular sleeve 72 has a passageway 74 with a square cross-section to complimentarily receive elongated portion 16 of frame 14 such that sleeve 72 is movable along elongated portion 16 between front end 18 and back end 20. An open-sided vertical support member 76, such as that provided by a channel iron, is secured to sleeve 72 with the open side facing front end 18 of elongated portion 16 and extends upwardly above frame 14. An elongated cross member 78 made from a tubular conduit with a square cross-section and has two ends 80 and 82. Pivotal connecting apparatus 84 pivotally connects elongated cross member 78 at substantially its center to open-sided vertical support member 76. A portion of engine 12 is connected by apparatus 86 disposed at end 80 and by apparatus 88 disposed at end 82.

Each engine connecting apparatus 86 and 88 includes a sleeve 90, which has a passageway 92 adapted to complimentarily receive elongated cross member 78 therein and to allow movement of sleeve 90 along elongated cross member 78. A bolt 94 is rotatably connected to sleeve 90 and has threads 96 adapted to threadedly engage with a threaded aperture provided in engine 12, such as the apertures in a housing on the rear of engine 12. Engine 12 is connected to frame 14 by screwing bolt 94 of apparatus 86 and 88 into threaded apertures in the housing.

Pivotal connecting apparatus 84 includes a sleeve 98 movably mounted on open-sided vertical support member 76 and has a slot 100. A screw member 102 is secured to elongated cross member 78 and disposed to extend away from elongated cross member 78 through slot 100 in sleeve 98 and into the open side of vertical support member 76. Screw member 102 is provided with screw threads 104 that extend from the end away from elongated cross member 78 toward elongated cross member 78. A first nut 106 is threadedly connected to screw member 102 and disposed between sleeve 98 and the open side of open-sided vertical support member 76. A second nut 108 is also threadedly connected to screw member 102 and disposed between sleeve 98 and elongated cross member 78. Elongated cross member 78 is connected to sleeve 98 by tightening second nut 108 against sleeve 98 and first nut 106 after elongated member 78 has been rotated about the axis formed by screw member 102 and bolts 94 have been screwed into the aperture into the housing provided on engine 12.

Sleeve moving apparatus 110 is used to selectively move sleeve 98 of pivotal connecting apparatus 84 toward and away from frame 14. Sleeve moving apparatus 110 includes a nut 112 secured to sleeve 98 of pivotal connecting apparatus 84. A threaded member 114 threadedly engages nut 112 and has a head 116 on one end adapted to be rotated by a wrench and an engaging pad 118 on the other end to engage sleeve 72. Sleeve 98 is selectively moved toward and away from frame 14 by rotating threaded member 114.

A locking bolt 120 is threadedly connected to sleeve 72 to engage elongated portion 16 of frame 14 and thereby prevent movement of second support device 32 relative to frame 14.

As best seen in FIGS. 1, 2 and 4, frame support apparatus 122 is used with frame 14 to rollingly support frame 10 above a support surface 124. At ends 20, 24, 26, a frame support apparatus 122 is connected to T-shaped frame 14 so that a plane formed by elongated portion 16 and cross portion 22 of frame 14 will lie substantially parallel to support surface 124. Each frame support apparatus 122 includes a sleeve 126 having a passageway 128 with a square cross-section adapted to be moved along elongated portion 16 and cross portion 22 of frame 14. A roller 130 is adapted to engage support surface 124 and an axle 132 rotatably mounts roller 130 to sleeve 126.

Figure 6:
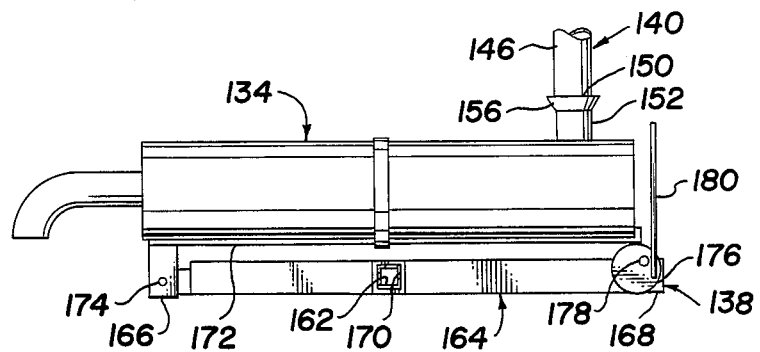
FIG. 6 is a side elevational view, partly in cross-section, taken along the lines and in the direction of the arrows 6—6 of the stand shown in FIG. 2.

As best seen in FIGS. 1, 2 and 6, stand 10 includes a left muffler 134 to deaden the noise from the left manifold of engine 12 and a right muffler 136 to deaden the noise from the right manifold of engine 12 after it has been started. Left muffler 134 is mounted to frame 14 by left muffler mounting apparatus 138 and the exhaust fluid from the left manifold of engine 14 is directed through muffler 134 by muffler connecting apparatus 140. Right muffler 136 is mounted to frame 14 by right muffler mounting apparatus 142 and the exhaust fluid from the right manifold of engine 14 is directed through muffler 136 by muffler connecting apparatus 144.

Mufflers 134 and 136 are placed in fluid communication with the manifold of engine 12 by muffler connecting apparatus 140 and 144, which uses a relatively inflexible tubular member 146. One end 148 of tubular member 146 is connected to the manifold provided on engine 12 and other end 150 is connected to relatively inflexible tubular connectors 152 or 154 of mufflers 134 and 136, respectively. A lip 156 extends around connectors 152 and 154 to assist in aligning tubular member 146 with the side opening into mufflers 134 and 136.

Muffler mounting apparatus 138 and 142 includes a sleeve 158 having a passageway 160 with a square cross-section of such size to permit movement of sleeve 158 along elongated portion 16 of frame 14. In sleeve 158, an aperture with a square cross-section is provided to face away from elongated portion 16. A tubular arm 162 with a square cross-section may be complimentarily received within the aperture in sleeve 158 and is disposed to extend in a direction substantially parallel with the direction in which cross portion 22 of frame 14 extends. A framework 164 has a first end 166, a second end 168, and an aperture 170 with a square cross-section adapted to complimentarily receive arm 162. A platform 172, adapted to receive muffler 134 or 136, is disposed above and pivotally connected by pin connector 174 to first end 166 of framework 164. A cam 176 is pivotally connected by pin connector 178 to second end 168 of framework 164 such that platform 172 is selectively moved upwardly away from and downwardly toward aperture 170 of framework 164 by moving handle 180, which is secured to cam 176, to pivot cam 176 around pin connector 178. Muffler 134 or 136 is disposed on platform 172 so that when platform 172 is moved upwardly away from aperture 170 in framework 164, tubular connector 152 or 154 for the side openings of muffler 134 or 136, respectively, is urged into engagement with end 150 of tubular member 146 of muffler connecting apparatus 140 or 146 and, thereby, fluidly connect muffler 134 or 136 to the manifold provided on engine 12.

As best seen in FIGS. 2, 7 and 8, muffler mounting apparatus 138 and 142 may include a discrete adjusting mounting device 182 to adjust framework 164 by discrete increments relative to frame 14. Discrete adjusting mounting device 182 has a male portion 184 adapted to fit within the aperture 159 in sleeve 158, as shown in FIG. 8, or aperture 160 in framework 164 and an offset portion 186 offset from male portion 184. Offset portion 186 has an inner passageway 188 and an outer passageway 190. Passageways 188 and 190 have a square cross-section to complimentarily receive arm 162. Framework 164 is adjusted by inserting arm 162 into either passageway 188 and 190 after male portion 184 is inserted into aperture 159, either with offset portion 186 directed downwardly as shown in FIG. 8, or with offset portion directed upwardly (not shown).

In operation, portable stand 10 is assembled by running sleeve 34 of first engine supporting apparatus 30, sleeve 158 of right muffler mounting apparatus 142, sleeve 158 of left muffler mounting apparatus 138 and sleeve 72 of second engine supporting apparatus 32 onto elongated portion 16 of frame 14. Frame 14 is then supported above support surface 124 by connecting sleeve 126 of frame supporting apparatus 122 at ends 20, 24 and 26 of frame 14. Engine 12 is lowered onto shoulders 48 and 66 of first engine supporting apparatus 30 and bolts 94 of second engine supporting apparatus 32 aligned with threaded apertures in and threadedly connected to a housing on engine 12. Bolt 71 of first engine supporting apparatus 30 and bolt 120 of second engine supporting apparatus 32 are then rotated to secure engine supporting apparatus 30 and 32 to frame 14. Threaded member 114 is rotated to support the rear portion of engine 12 above frame 14 and any apparatus used to sent engine 12 on stand 10 disconnected from the engine.

Framework 164 is connected to frame 14 to provide a general position for connecting mufflers 134 and 136 to engine 12. When one end of arm 162 is positioned in aperture 188 or 190 of discrete mounting device 182, then the other end of arm 162 is positioned in aperture 170 of framework 164 and male portion 184 is positioned in aperture 159 of sleeve 158 or the other end of arm 162 is positioned in aperture 159 and male portion 184 is positioned in aperture 170. After framework 164 is generally positioned relative to frame 14, mufflers 134 and 136 are positioned on platform 172 and tubular member 146 aligned with the outlet manifold provided on engine 12 and tubular connector 152 or 154. Handle 180 is then rotated, which places mufflers 134 and 136 is fluid communication with the exhaust manifold of engine 12.

As best seen in FIGS. 1 and 9, to test internal combustion engine 12 after being supported on stand 10, a flexible inlet conduit 200, which leads from a coolant supply source 202, such as water, is connected to a coolant inlet provided on engine 12. A flexible outlet conduit 204, which leads to a drain 206, is connected to a coolant outlet provided on engine 12. A pressure gauge 208 is mounted in fluid communication with a heater hose port provided on engine 12. Valve 210, provided in inlet conduit 200, is turned to its on position to flow coolant from the coolant supply source through inlet conduit 200, engine 12 and outlet conduit 204 to drain 206. The pressure of the coolant flowing through engine 12 is adjust to the correct coolant pressure by adjusting a pressure regulating valve 212 provided in inlet conduit 200. An orifice 214 of 0.093 inches in diameter is provided in outlet conduit 204 to meter the flow of coolant through engine 12. After the coolant is flowing through engine 12, the exterior of the engine is inspected for leaks.

If desired, a fuel is supplied to engine 12 via conduit 216 connected to a fuel pump provided on engine 12 and leading to a container 218 supporting a quantity of fuel. Engine 12 is then connected to an electrical power source 220, such as a battery, and started by throwing a switch 222. The exhaust fluids pass through muffler connecting apparatus 140 and 144, as jointly represented by line 224 in FIG. 9, and mufflers 134 and 136, as jointly represented by block 226 in FIG. 9, to deaden the noise from engine 12.

The invention having been described, what is claimed is:

1. A portable stand used to rollingly support an internal combustion engine, comprising: a frame including an elongated portion and a cross portion connected to the elongated portion to form a generally T shape; engine support means adapted to be connected to said frame for supporting the engine above said frame, said engine support means including a first supporting device disposed to engage a front portion of the engine and a second supporting device disposed to engage a rear portion of the engine, the first supporting device including a sleeve adapted to be moved along the elongated portion of said frame, a first cross support member connected to the sleeve and extending to a first end on one side of the engine, a second cross support member connected to the sleeve and extending to a second end on the side opposite of the first side of the engine, a first support column disposed to extend from the first cross support member, and a second support column disposed to extend from the second cross support member; and frame support means adapted to be connected to each end of said T-shaped frame for rollingly supporting said frame above a support surface, said frame being supported such that the elongated and cross portions of said frame forms a plane that lies substantially parallel to the support surface.

2. A stand as set forth in claim 1, further comprising: each of the first and second support columns including a shoulder for supporting the engine provided by its upper most edge, a length sufficient to support the engine at a location above and without contacting said frame and a slot provided in the shoulder so as to receive a lip of an oil pan provided on the engine.

3. A portable stand used to rollingly support an internal combustion engine, further comprising: a frame including an elongated portion and a cross portion connected to the elongated portion to form a generally T shape; engine support means adapted to be connected to said frame for supporting the engine above said frame, said engine support means including a first supporting device disposed to engage a front portion of the engine and a second supporting device disposed to engage a rear portion of the engine, the second supporting device including a sleeve adapted to be moved along the elongated portion of said frame, an open-sided vertical support member connected to the sleeve and disposed to extend upwardly above said frame, an elongated cross member, pivotal connecting means for pivotally connecting the elongated cross member at substantially its center to the open-sided vertical support member and engine connecting means disposed at each end of the elongated cross member for connecting the elongated cross member to a portion of the engine; and frame support means adapted to be connected to each end of said T-shaped frame for rollingly supporting said frame above a support surface, said frame being supported such that the elongated and cross portions of said frame forms a plane that lies substantially parallel to the support surface, each of the engine connecting means disposed at each end of the elongated cross member including a sleeve disposed for movement along the elongated cross member and a bolt rotatably connected to the sleeve and having threads adapted to threadedly engage with a threaded aperture provided in the engine such that by screwing the bolt into the aperture the engine is connected to the stand, the pivotal connecting means including a sleeve movably mounted on the open-sided vertical support member and having a slot provided in the sleeve, a screw member connected to the elongated cross member and disposed to away extend from the elongated member through the sleeve, the screw member being provided with screw threads extending from the end away from the elongated cross member toward the elongated cross member, first and second nuts threadedly connected to the screw member, the first nut being disposed between the sleeve and the open side of the open-sided vertical support member, the second nut being disposed between the sleeve and the elongated cross member such that the elongated cross member is secured to the sleeve by tightening the second nut against the sleeve and first nut.

4. A stand as set forth in claim 3, further comprising: sleeve moving means for selectively moving the sleeve of the pivotal connecting means toward and away from said frame.

5. A stand as set forth in claim 4, further comprising: said sleeve moving means including a nut connected to the sleeve of the pivotal connecting means, a threaded member threadedly engaging the nut and having a head on one end adapted to be rotated by a wrench and an engaging pad on the other end to engage the elongated portion of said T-shaped frame such that the sleeve is selectively moved toward and away from said frame by rotating the threaded member.

6. A portable stand used to rollingly support an internal combustion engine, comprising: a frame including an elongated portion and a cross portion connected to the elongated portion to form a generally T shape; engine support means adapted to be connected to said frame for supporting the engine above said frame; frame support means adapted to be connected to each end of said T-shaped frame for rollingly supporting said frame above a support surface, said frame being supported such that the elongated and cross portions of said frame forms a plane that lies substantially parallel to the support surface, muffler means for deadening the noise of the engine after the engine has been started, said muffler means including a side opening; muffler mounting means for mounting said muffler means to said frame; and muffler connecting means for directing the exhaust fluid from the engine through said muffler means, said muffler connecting means including a relatively inflexible tubular member, one end of the tubular member adapted to engage a manifold of the engine and being disposed to receive exhaust fluids from the engine; and said muffler mounting means including a sleeve adapted to be moved along the elongated portion of said frame and having an aperture disposed to face away from the elongated portion of said frame, an arm adapted to be received within the aperture in the sleeve and disposed to extend in a direction substantially parallel with the direction in which the cross portion of said frame extends, a framework having first and second ends and an aperture adapted to receive the arm, a platform adapted to receive said muffler means disposed above and pivotally connected to the first end of the framework, a cam pivotally connected to the second end of the framework such that the platform is selectively moved upwardly away from and downwardly toward the framework by pivoting the cam, said muffler means being disposed on the platform so that when the platform is moved upwardly away from the framework the side opening of said muffler means is urged into engagement with another end of the tubular member of said muffler connecting means to fluidly connect said muffler means to the engine.

7. A stand as set forth in claim 6, further comprising: said muffler mounting means including discrete adjusting mounting means for moving the framework by discrete increments relative to the frame.

8. A stand as set forth in claim 7, further comprising: said muffler mounting means including the discrete adjusting mounting means having a male portion adapted to fit within the aperture in the sleeve and an offset portion adapted to receive the arm and offset from the male portion.

9. A portable stand used to test run an internal combustion engine, comprising: a frame, said frame including an elongated portion and a cross portion; engine support means connected to said frame for supporting the engine above said frame; frame support means connected to said frame for supporting said frame above a support surface; means for supplying fuel to the engine; means connected to a stationary supply of water for continuously providing coolant to the engine; means connected to a stationary drain for continuously receiving coolant from the engine; muffler means connected to said frame for deadening the noise of the engine after the engine has been started, said muffler means including a side opening; muffler mounting means for mounting said muffler means to said frame; and muffler connecting means for directing the exhaust fluid from the engine through said muffler means, said muffler connecting means including a relatively inflexible tubular member, one end of the tubular member engaging a manifold of the engine and being disposed to receive exhaust fluids from the engine; and said muffler mounting means including a sleeve adapted to be moved along the elongated portion of said frame and having an aperture disposed to face away from the elongated portion of said frame, an arm adapted to be received within the aperture in the sleeve and disposed to extend in a direction substantially parallel with the direction in which the cross portion of said frame extends, a framework having first and second ends and an aperture adapted to receive the arm, a platform adapted to receive said muffler disposed above and pivotally connected to the first end of the framework, a cam pivotally connected to the second end of the framework such that the platform is selectively moved upwardly away from and downwardly toward the framework by pivoting the cam, said muffler means being disposed on the platform so that when the platform is moved upwardly away from the framework the side opening of said muffler means is urged into engagement with another end of the tubular member of said muffler connecting means to fluidly connect said muffler means to the engine.

10. A stand as set forth in claim 9, further comprising: said muffler mounting means including discrete adjusting mounting means for moving the framework by discrete increments relative to the frame.

11. A stand as set forth in claim 10, further comprising: said muffler mounting means including the discrete adjusting mounting means having a male portion adapted to fit within the aperture in the sleeve and an offset portion adapted to receive the arm and offset from the male portion.

* * * * *